(12) United States Patent
Han et al.

(10) Patent No.: US 12,549,420 B2
(45) Date of Patent: Feb. 10, 2026

(54) METHOD AND DEVICE FOR DATA TRANSMISSION WITH REDUCED SUPPLY NOISE

(71) Applicant: IUCF-HYU (INDUSTRY-UNIVERSITY COOPERATION FOUNDATION HANYANG UNIVERSITY), Seoul (KR)

(72) Inventors: Jaeduk Han, Seoul (KR); Seonghyun Park, Seoul (KR); Eunji Song, Seoul (KR); Jeonghyu Yang, Seoul (KR); Youngmin Oh, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 104 days.

(21) Appl. No.: 18/447,703

(22) Filed: Aug. 10, 2023

(65) Prior Publication Data
US 2024/0064046 A1 Feb. 22, 2024

(30) Foreign Application Priority Data

Aug. 11, 2022 (KR) ......... 10-2022-0100356
Aug. 7, 2023 (KR) ......... 10-2023-0103130

(51) Int. Cl.
*H04L 25/49* (2006.01)
*H04L 1/00* (2006.01)
*H04L 25/03* (2006.01)

(52) U.S. Cl.
CPC ........ *H04L 25/4917* (2013.01); *H04L 1/0041* (2013.01); *H04L 25/03859* (2013.01)

(58) Field of Classification Search
CPC ...... G06F 11/07; G06F 11/10; G06F 11/0793; G06F 13/42; G06F 13/4221;
(Continued)

(56) References Cited

U.S. PATENT DOCUMENTS 10,812,130 B2   10/2020 Talla et al.
12,135,607 B2 * 11/2024 Bhatia ................. G06F 11/0787
(Continued)

FOREIGN PATENT DOCUMENTS

JP   2004-153558 A   5/2004
JP   2008-245278 A   10/2008
(Continued)

OTHER PUBLICATIONS

Lynch, "The suitability of various line coding techniques for the simultaneous transmission of data over copper telephone lines with voice over", Dec. 1997, XP-002213739, pp. 12-59, (49 pages) http://www.engr.usask.ca/dept/ele/thesis/djlthes.pdf.
(Continued)

*Primary Examiner* — Shawkat M Ali
(74) *Attorney, Agent, or Firm* — Sughrue Mion, PLLC (57) ABSTRACT

The disclosure relates to a pulse amplitude modulation (PAM) data encoding technique capable of reducing effects due to supply noise. A data transmission method according to an embodiment includes identifying an encoding rule of mapping a plurality of pieces of N-bit data and M data symbols, according to a designated level, obtaining a plurality of segmented pieces of data by performing segmentation on input data in units of N bits, mapping the obtained plurality of segmented pieces of data to the M data symbols based on the identified encoding rule, and transmitting the M data symbols obtained as a result of mapping through a plurality of single-ended data lines, wherein an absolute
(Continued)

value of a sum of the M data symbols has a value equal to or less than the designated level.

13 Claims, 10 Drawing Sheets

(58) Field of Classification Search
CPC ...... G06F 13/4286; H03M 13/00; H04L 1/00; H04L 1/0041; H04L 5/12; H04L 25/03; H04L 25/49; H04L 25/4917; H04L 25/03859; H04L 27/36; H04W 72/04
USPC ....... 375/219, 260, 262, 265, 267, 295, 395; 714/752, 759, 763, 764
See application file for complete search history.

(56) References Cited

U.S. PATENT DOCUMENTS

| | | |
|---|---|---|
| 2008/0240049 A1 | 10/2008 | Gaur |
| 2013/0275828 A1 | 10/2013 | Abbasfar |
| 2014/0071873 A1 | 3/2014 | Wang et al. |
| 2017/0094602 A1 | 3/2017 | Dinh et al. |
| 2020/0007362 A1* | 1/2020 | Kim ................ H04L 25/4917 |
| 2021/0280631 A1 | 9/2021 | Kang et al. |
| 2022/0086328 A1 | 3/2022 | Yu et al. |

FOREIGN PATENT DOCUMENTS

| | | |
|---|---|---|
| JP | 2011-147087 A | 7/2011 |
| KR | 10-1709421 B1 | 2/2017 |
| KR | 10-2017-0036455 A | 4/2017 |
| KR | 10-2020-0007558 A | 1/2020 |
| KR | 10-2020-0092135 A | 8/2020 |

OTHER PUBLICATIONS

Extended European Search Report dated Jan. 5, 2024 in Application No. 23190684.3.

Office Action issued Aug. 6, 2024 in Korean Application No. 10-2023-0103130.

* cited by examiner

| W3 | W2 | W1 | W0 | LEVEL |
|----|----|----|----|-------|
| -3 | -3 | 3  | 3  | 0 |
| -3 | -1 | 1  | 3  | 0 |
| -3 | -1 | 3  | 1  | 0 |
| -3 | 1  | -1 | 3  | 0 |
| -3 | 1  | 1  | 1  | 0 |
| -3 | 1  | 3  | -1 | 0 |
| -3 | 3  | -3 | 3  | 0 |
| -3 | 3  | -1 | 1  | 0 |
| -3 | 3  | 1  | -1 | 0 |
| -3 | 3  | 3  | -3 | 0 |
| -1 | -3 | 1  | 3  | 0 |
| 3  | 1  | -3 | -1 | 0 |
| ⋮  |    |    |    |   |
| 3  | 1  | -1 | -3 | 0 |
| 3  | 3  | -3 | -3 | 0 |

METHOD AND DEVICE FOR DATA TRANSMISSION WITH REDUCED SUPPLY NOISE

CROSS-REFERENCE TO RELATED APPLICATION

This application is based on and claims priority under 35 U.S.C. § 119 to Korean Patent Application No. 10-2022-0100356, filed on Aug. 11, 2022, in the Korean Intellectual Property Office and Korean Patent Application No. 10-2023-0103130, filed on Aug. 7, 2023, in the Korean Intellectual Property Office, the disclosure of which is incorporated by reference herein in its entirety.

BACKGROUND

1. Field

The disclosure relates to a method and device for data transmission with reduced supply noise, and more particularly, to a pulse amplitude modulation (PAM) data encoding technique capable of reducing effects due to supply noise when data is transmitted through a plurality of single-ended channels. This invention was supported by Samsung Research Funding & Incubation Center of Samsung Electronics under Project Number SRFC-IT2001-02.

2. Description of the Related Art

Data transmitted between integrated circuit devices is stored in a semiconductor integrated circuit under the control by a central processing unit (CPU) or a graphics processing unit (GPU). Among factors influencing the performance of a semiconductor integrated circuit, that is, main memory or graphics memory, data processing speed occupies the largest portion.

Data transmission between integrated circuit devices is in the form of data signals driven in parallel channels of a data bus, which is so-called data bits. Data bits may be influenced by supply noise, such as simultaneous switching noise (SSN), common mode noise, and/or electromagnetic interference (EMI), according to a state of data and the frequency of data transition. To reduce the influences due to such supply noises, ensemble non-return-to-zero (ENRZ) or chord non-return-to-zero 5-bit (CNRZ-5) data encoding techniques or the like have emerged, and such techniques may be effectively used when transmitting NRZ signals.

As technology has been developed, in a signal processing field that requires high-speed operations, such as ultrahigh speed wired/wireless communication integrated circuits (IC), communication units of processing units such as CPU/GPU, memory-CPU communication units, or the like, an N-level pulse amplitude modulation (PAM N) technique capable of transmitting signals having 2 bits or more instead of 1 bit at one time may be applied to increase signal transmission efficiency. For example, in a case of a PAM 4 signal, unlike a PAM 2 signal generally used in the related art, data corresponding to 2 bits may be transmitted at one time, and thus data transmission speed and transmission efficiency may be increased.

However, data processing technology using the PAM 4 signal has been insignificantly developed until now, and thus data encoding technology that may increase the data transmission efficiency in transmitting PAM 4 signals is insignificant, and a differential pair channel structure is used instead of a single-ended channel structure to reduce the effects due to supply noise.

SUMMARY

As compared with a single-ended channel structure, the differential channel structure described above has low pin efficiency and data rate, and high power consumption.

Provided is a method and device for data transmission with reduced supply noise, the method and device providing a pulse amplitude modulation (PAM) data encoding technique capable of reducing effects due to supply noise when data is transmitted through a plurality of single-ended channels.

Provided is a method and device for data transmission with reduced supply noise, the method and device providing an encoding technique capable of reducing effects due to supply noise and increasing the number of transmitted bits by limiting an absolute sum of symbols placed in a plurality of single-ended data channels.

Additional aspects will be set forth in part in the description which follows and, in part, will be apparent from the description, or may be learned by practice of the presented embodiments of the disclosure.

According to an aspect of the disclosure, a data transmission method includes identifying an encoding rule of mapping a plurality of pieces of N-bit data and M data symbols, according to a designated level, obtaining a plurality of segmented pieces of data by performing segmentation on input data in units of N bits, mapping the obtained plurality of segmented pieces of data to the M data symbols based on the identified encoding rule, and transmitting the M data symbols obtained as a result of mapping through a plurality of single-ended data lines, wherein an absolute value of a sum of the M data symbols has a value equal to or less than the designated level.

In the data transmission method according to an embodiment, the identifying of the encoding rule may include identifying a mapping table representing the M data symbols mapped with the plurality of pieces of N-bit data.

In the data transmission method according to an embodiment, the encoding rule may be determined based on a K-level pulse amplitude modulation (PAM K) data encoding method.

The data transmission method according to an embodiment may further include obtaining feedback information about a reception error rate of the M data symbols, and determining whether to adjust the designated level based on the obtained feedback information.

The data transmission method according to an embodiment may further include decreasing the designated level when the reception error rate is higher than a preset first criterion, and increasing the designated level when the reception error rate is lower than a preset second criterion.

In the data transmission method according to an embodiment, the encoding rule may be determined based on any one method of a 5 bit 4 quaternary (5B4Q) method, a 6 bit 4 quaternary (6B4Q) method, or a 7 bit 4 quaternary (7B4Q) method.

In the data transmission method according to an embodiment, the designated level may be 0.

In the data transmission method according to an embodiment, at least one piece of data included in the mapping table may have an absolute value of a sum of data symbols of 0.

In the data transmission method according to an embodiment, the designated level may be 2 or less.

In the data transmission method according to an embodiment, at least one piece of data included in the mapping table may have an absolute value of a sum of data symbols of 2 or less.

According to another aspect of the disclosure, a data transmission device includes a communication unit, a memory storing at least one instruction, and a processor connected to the communication unit, wherein the processor, by executing the at least one instruction, is configured to identify an encoding rule of mapping a plurality of pieces of N-bit data and M data symbols, according to a designated level, obtain a plurality of segmented pieces of data by performing segmentation on input data in units of N bits, map the obtained plurality of segmented pieces of data to the M data symbols based on the identified encoding rule, and transmit the M data symbols obtained as a result of mapping through a plurality of single-ended data lines, wherein an absolute value of a sum of the M data symbols has a value equal to or less than the designated level.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments according to the disclosure are described with reference to accompanying drawings. Reference numerals have been given to components of each drawing, and like reference numerals may denote like elements in different drawings. In the description, certain detailed explanations of the related art are omitted when it is deemed that they may unnecessarily obscure the essence of the disclosure. The disclosure may, however, be embodied in many different forms and should not be construed as being limited to the exemplary embodiments set forth herein.

The terms used in the present specification are merely used to describe particular embodiments, and are not intended to limit the inventive concept. An expression used in the singular encompasses the expression of the plural, unless it has a clearly different meaning in the context.

The embodiments described in this disclosure and the configurations shown in the drawings are only one preferred example of the disclosed invention, and there may be various modified examples that can replace the embodiments and drawings of the disclosure at the time of filing the application of the disclosure.

Throughout the disclosure, when a portion is referred to as "being connected to" another portion, a case of being directly connected and a case of being indirectly connected may be included, and indirect connection includes connection through a wireless communication network.

It will be further understood that the terms "comprises" and/or "comprising" used herein specify the presence of stated features, numbers, steps, operations, components, members, or combinations thereof, but do not preclude the presence or addition of one or more other features, numbers, steps, operations, components, members, or combinations thereof.

While such terms as "first," "second," etc., may be used to describe various components, such components must not be limited to the above terms. The above terms are used only to distinguish one component from another. For example, a first component may be named as a second component, and similarly, a second component may be named as a first component, without departing from the scope of the present disclosure.

In addition, terms such as " . . . unit", " . . . group", " . . . block", " . . . member", and " . . . module" may mean a unit that processes at least one function or operation. For example, the terms may mean at least one piece of hardware such as a field-programmable gate array (FPGA)/application specific integrated circuit (ASIC), at least one piece of software stored in a memory, or at least one process processed by a processor.

Reference numerals attached to each of steps are used to identify each of steps, and these reference numerals do not indicate the order of each step, and each step may be performed in a different order from the specified order unless a specific order is clearly stated in the context.

Hereinafter, embodiments according to the disclosure are described in detail with reference to accompanying drawings, and the title of the disclosure is 'method and device for data transmission with reduced supply noise", but for convenience of description, the disclosure is described below by being referred to as 'a data transmission method or data transmission device'.

Figure 1:
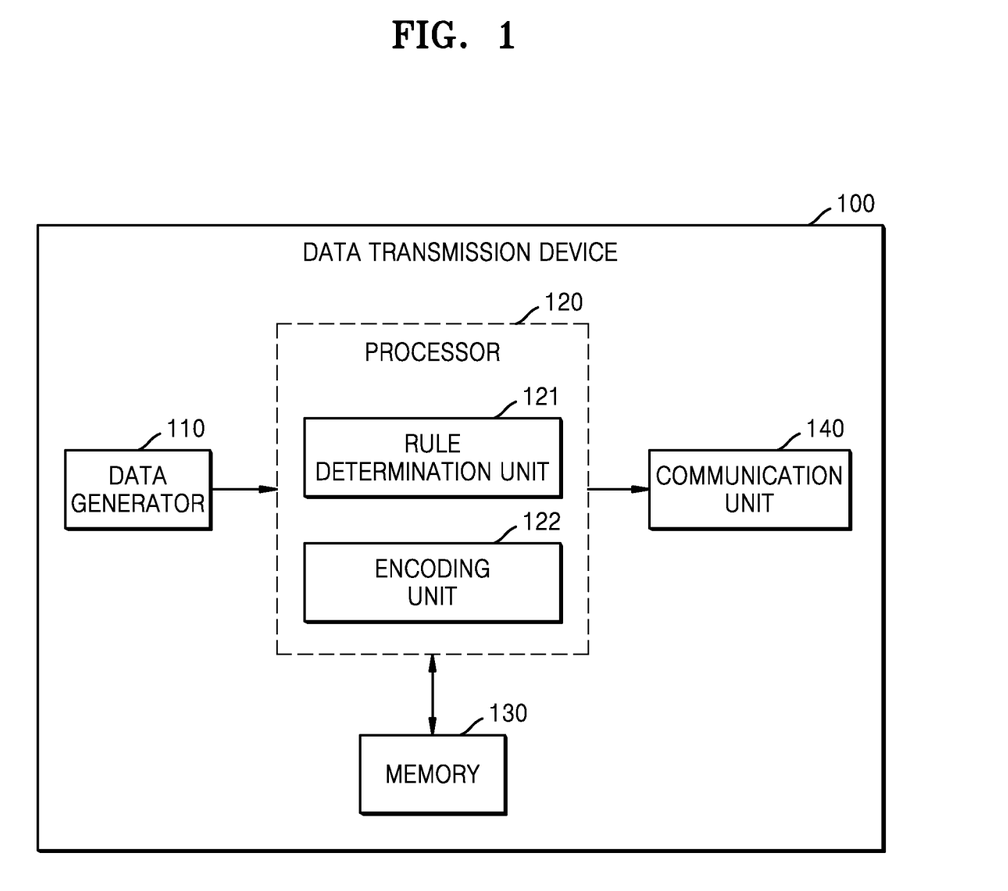
FIG. 1 is a block diagram illustrating a data transmission device according to an embodiment.

FIG. 1 is a block diagram illustrating a data transmission device 100 according to an embodiment.

Referring to FIG. 1, the data transmission device 100 according to an embodiment may include a data generator 110, a processor 120, a memory 130, and a communication unit 140, and the processor 120 may include a rule determination unit 121 and an encoding unit 122. However, this is only an example, and the data transmission device 100 may also be configured by the processor 120, the memory 130, and the communication unit 140. Also, the data transmission device 100 may also include more components than the components described above.

According to an embodiment, the data generator 110 is a component that generates input data, and the generated data may be transmitted to the processor 120. According to an embodiment, the input data may be represented as a binary sequence.

For example, the processor 120 may control at least one other component (e.g., a hardware or software component) of the data transmission device 100, which is connected to the processor 120, by executing software configured by at least one instruction, and may perform various data processing or calculations. According to an embodiment, as at least a portion of data processing or calculation, the processor 120 may load instructions or data received from other components into the memory 130, process the instructions or data stored in the memory 130, and store result data in the memory 130.

For convenience of description, FIG. 1 shows that the rule determination unit 121 and the encoding unit 122 are included in one processors 120, but in another embodiment, two or more processors 120 may be respectively implemented to function as the rule determination unit 121 and/or the encoding unit 122. Also, the processor 120 may be configured as a single processor 120 instead of including modules that perform particular functions. Hereinafter, for convenience of description, a case where the processor 120 includes the rule determination unit 121 and the encoding unit 122 is described.

According to an embodiment, the rule determination unit 121 may identify an encoding rule of mapping a plurality of pieces of N-bit data and M data symbols according to a designated level. For example, the rule determination unit 121 may generate a mapping table in which N-bit data and M data symbols are mapped according to the identified encoding rule.

A level may be designated based on a user's selection or a communication environment. For example, in a noise-tolerant environment, a data rate may be increased by increasing a designated level, and in a noise-vulnerable environment, data may be stably transmitted through a method of lowering a designated level.

An encoding rule may follow, for example, a K-level pulse amplitude modulation (PAM) data encoding rule. For example, the rule determination unit 121 determined to follow the PAM4 encoding rule may implement 5 bits as four PAM 4 symbols according to a 5 bit 4 quaternary (5B4Q) method, or may implement 7 bits as four PAM 4 symbols according to a 7B4Q method. However, this is only an example of an encoding rule, and the encoding rule according to the disclosure is not limited thereto. According to another example, the encoding rule may also include a 6B4Q method.

The rule determination unit 121 may determine an encoding rule based on a designated level. A level may be, for example, determined as an absolute value of a sum of M data symbols configuring one data. Data transmitted by the data transmission device 100 according to an embodiment must have an absolute value of a sum of M data symbols transmitted simultaneously equal to or less than a designated level.

For example, in a case of following a 5B4Q method, a sum of four symbols representing one data configured by 5 bits may indicate a level of the data. For example, in a case of a PAM 4 signal, as 2-bit signals may be transmitted at one time, a total of four types of signals, such as '00', '01', '10', '11', or the like, may be generated, and each data symbol may be expressed as '−3', '−1', '+1', and '+3'. In this case, the absolute values of the sum of 4Q symbols may vary from 0 to 12, and a total level may be divided into 13 levels. In the disclosure, the absolute value of a sum may be used as the same meaning as the absolute sum.

A mapping table may be generated based on a designated level. For example, a total sum of each of M data symbols included in the mapping table may have a value equal to or less than a designated level.

For example, when the designated level is '0', at least one piece of data included in the mapping table may have an absolute sum of '0' of data symbols. As another example, when the designated level is '2', at least one piece of data included in the mapping table may have an absolute sum of '2' or less of data symbols.

According to an embodiment, in a method and device for data transmission with reduced supply noise, signal integrity (SI) may be improved by reducing the effects due to supply noise by limiting an absolute sum of simultaneously transmitted data symbols.

Also, in the method and device for data transmission with reduced supply noise according to an embodiment, data rates are improved by using a single-ended channel as compared to a differential channel structure, power consumption is reduced, and pin-efficiency may be increased at the same time.

According to various embodiments, the encoding unit 122 may segment input data into N-bit units according to an encoding rule, and generate M data symbols by comparing the segmented pieces of data with a mapping table.

For example, when the encoding rule is determined as 5B4Q, the encoding unit 122 may segment the input data into 5 bits and express the input data into four data symbols by comparing the segmented pieces of data with the mapping table. As another example, when the encoding rule is determined as 7B4Q, the encoding unit 122 may segment the input data into 7 bits and express the input data into four data symbols by comparing the segmented pieces of data with the mapping table.

According to an embodiment, the communication unit 140 may include a plurality of drivers connected to a plurality of data lines to simultaneously transmit M data symbols. Also, the communication unit 140 may be configured such that a connection structure of loads included in each driver is changed according to data symbols.

Figure 2:
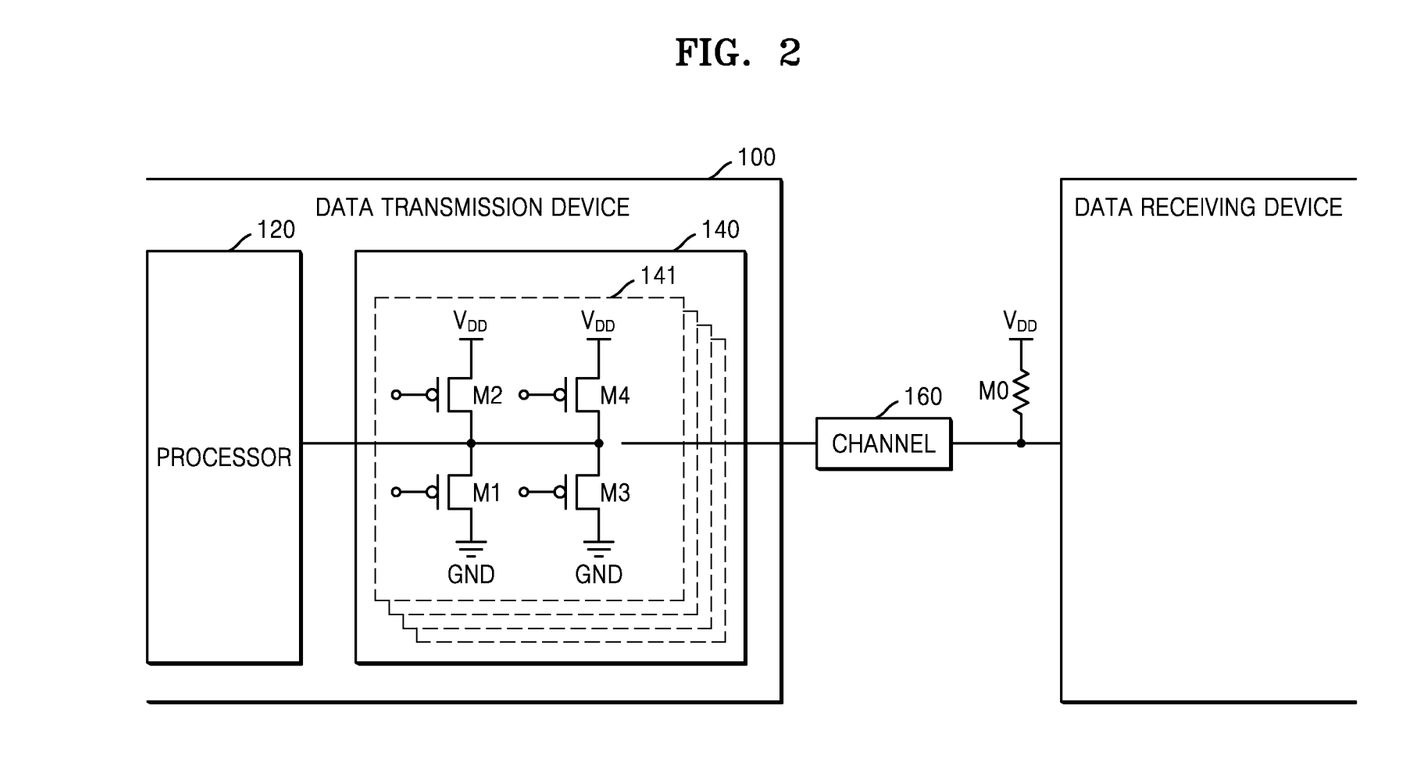
FIG. 2 is a circuit diagram illustrating some components of a data transmission device according to an embodiment.

FIG. 2 is a circuit diagram illustrating some components of a data transmission device according to an embodiment.

For example, as shown in FIG. 2, the communication unit 140 may include a plurality of drivers 141, and each driver 141 may include four loads including first to fourth loads M1, M2, M3, and M4. A connection structure of loads connected to a channel 160 may be changed depending on how the four loads are turned on/off for switches of the processor 120.

Although the channel 160 is represented as a single component in FIG. 2, this is for convenience of description. The channel 160 actually includes a plurality of single-ended data lines, and data may be transmitted to a data receiving device through the plurality of data lines connected to each driver 141. For example, the channel 160 may include four single-ended data lines or eight single-ended data lines.

Figure 3:
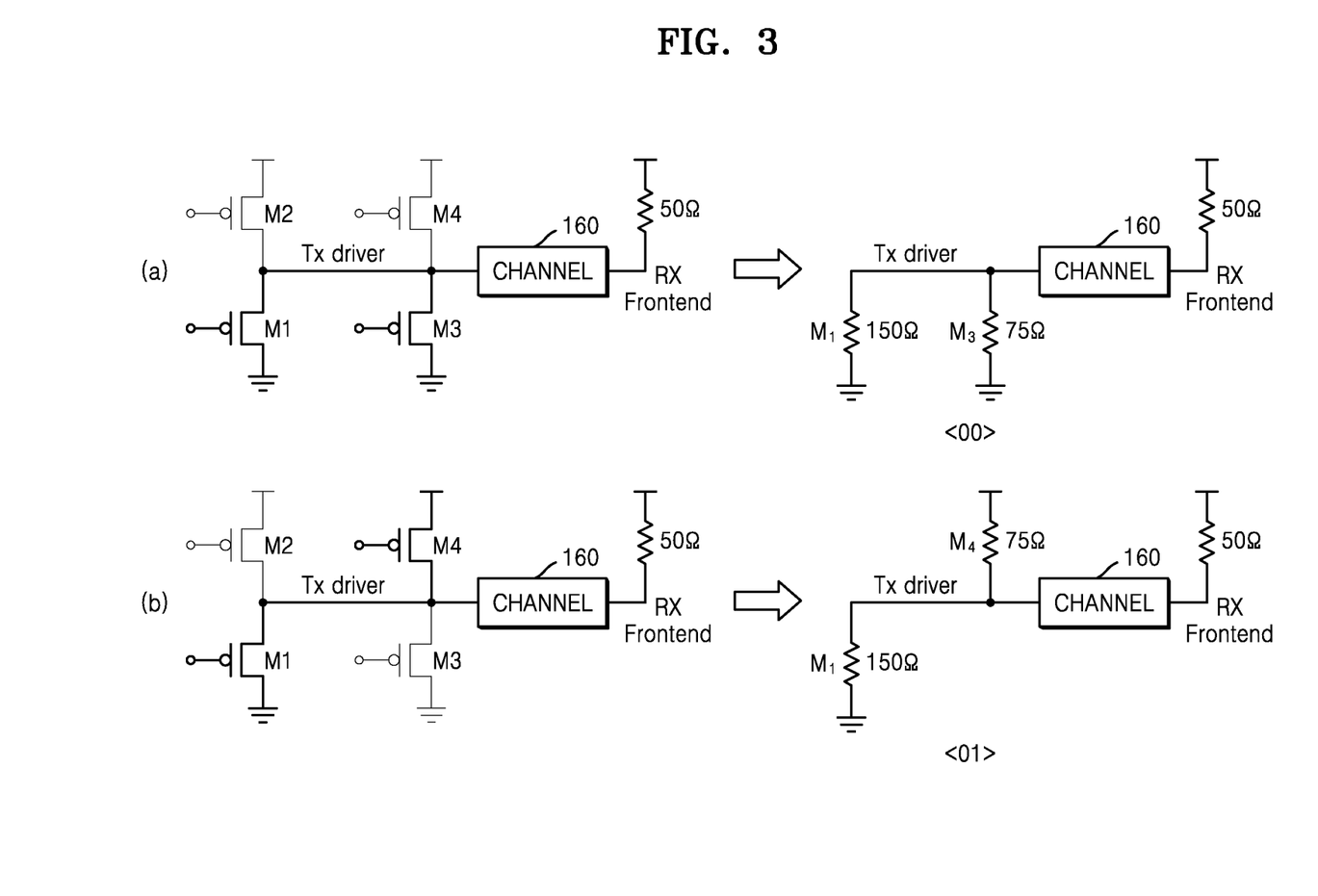
FIG. 3 is a diagram illustrating a connection structure of load elements when a data symbol is 00 or 01, according to an embodiment.

FIG. 3 is a diagram illustrating a connection structure of load elements when a data symbol is 00 or 01, according to an embodiment.

When looking at a connection structure in which loads of the driver 141 described above with reference to FIG. 2 are connected to the channel 160 according to a type of data symbol with reference to FIG. 3, in a case where the data symbol is '00', the connection structure has a structure in which only the first load M1 and the third load M3 are connected to the channel 160 as shown in (a) of FIG. 3. In (a) of FIG. 3, when M1 is 150 ohms and M3 is 75 ohms, a total resistance may be 100 ohms.

When the data symbol is '01', as shown in (b) of FIG. 3, the connection structure has a structure in which only the first load M1 and the fourth load M4 are connected to the channel 160. In (b) of FIG. 3, when M1 is 150 ohms and M4 is 75 ohms, a total resistance may be 180 ohms.

Figure 4:
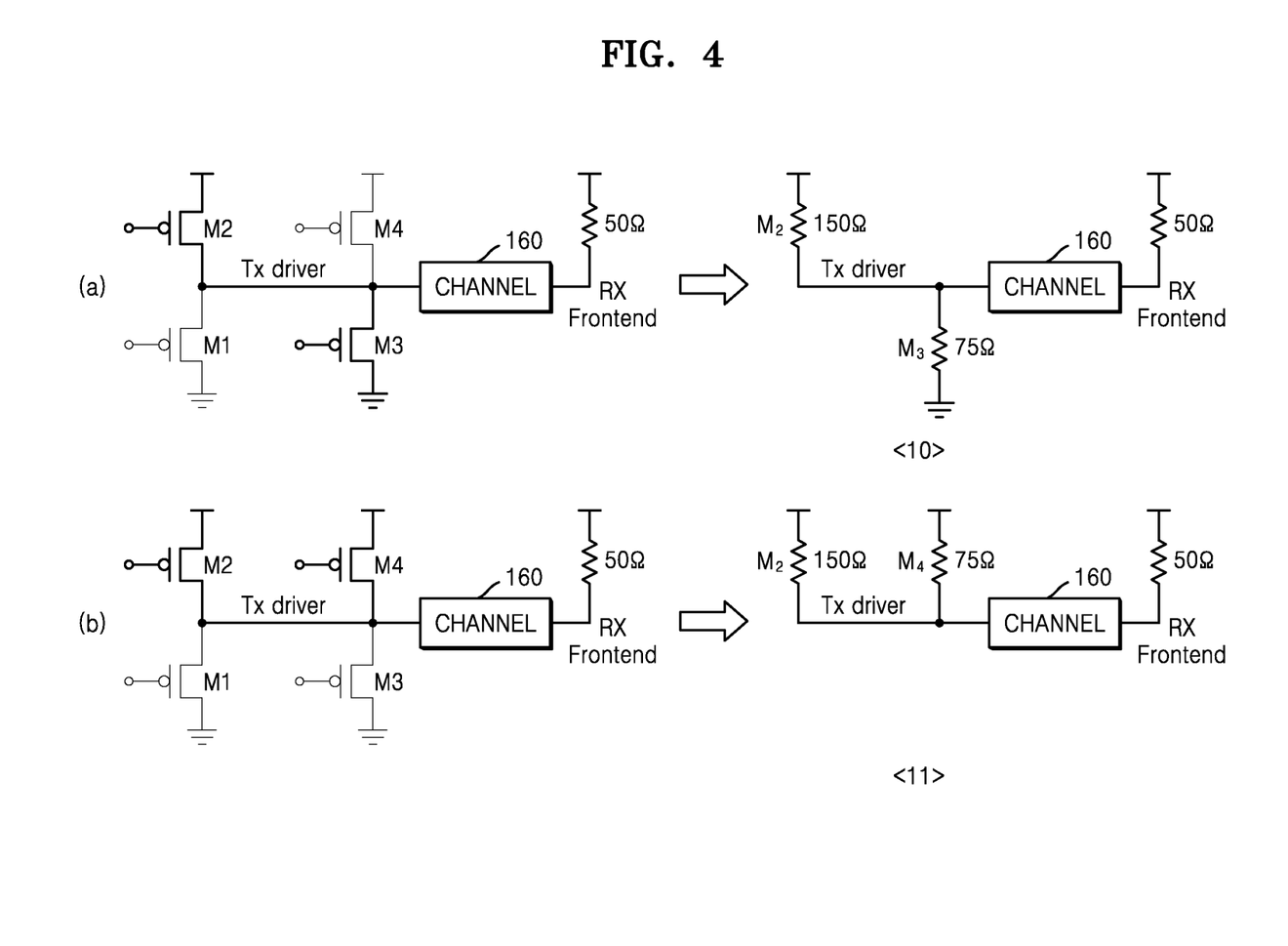
FIG. 4 is a diagram illustrating a connection structure of load elements when a data symbol is 10 or 11, according to an embodiment.

FIG. 4 is a diagram illustrating a connection structure of load elements when a data symbol is 10 or 11, according to an embodiment.

When the data symbol is '10', as shown in (a) of FIG. 4, the connection structure has a structure in which only the second load M2 and the third load M3 are connected to the channel 160. In (a) of FIG. 4, when M2 is 150 ohms and M3 is 75 ohms, a total resistance may be 112.5 ohms.

When the data symbol is '11', as shown in (b) of FIG. 4, the connection structure has a structure in which only the second load M2 and the fourth load M4 are connected to the channel 160. Also, in this case, a total load value is Rterm/M2/M4, and as any load does not have a structure connected to a ground, there is no voltage difference, and a current does not flow. Accordingly, in this case, a total power consumption is zero.

That is, power consumption according to a data symbol may be the greatest when the data symbol is 00, and may decrease in an order of 10, 01, and 11.

Next, as described above with reference to FIGS. 3 and 5, when a pseudo open drain (POD) termination circuit is used, a current generated is shown in Table 1.

TABLE 1

Figure 5:
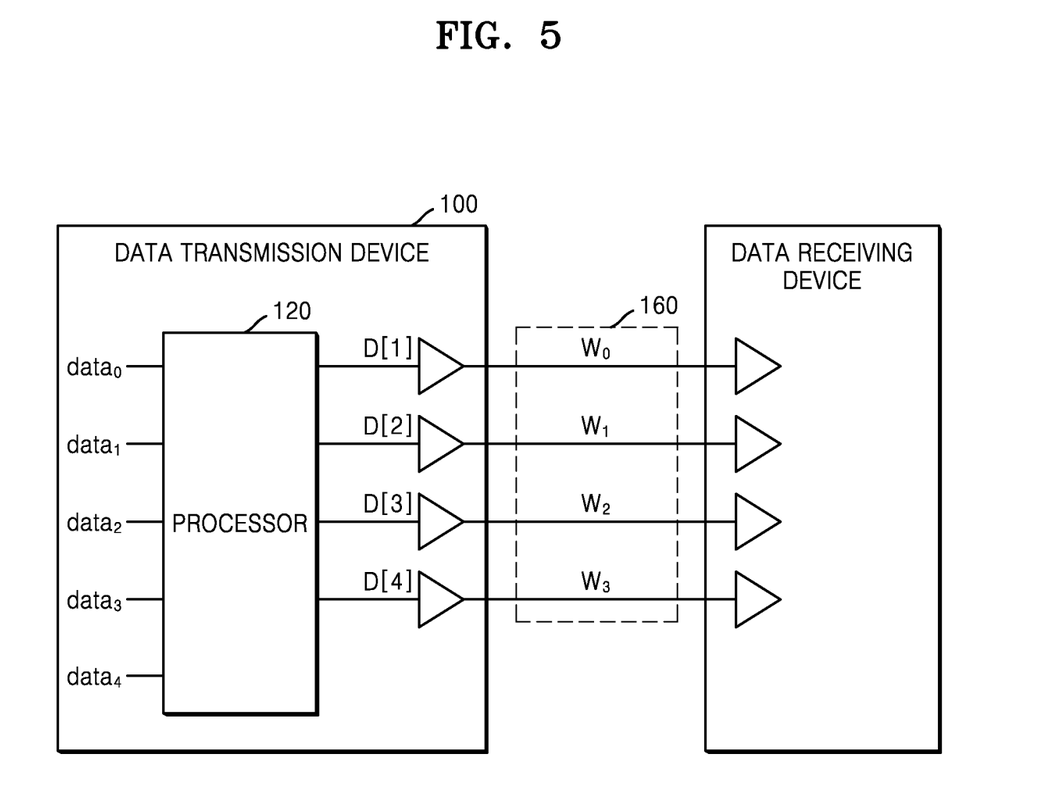
FIG. 5 is a diagram illustrating an example in which a data transmission device transmits data, according to an embodiment.

| Data symbol | 00 | 01 | 10 | 11 |
|---|---|---|---|---|
| turn-on MOSFET | M1, M3 | M1, M4 | M2, M3 | M2, M4 |
| $I_D$ | $\frac{V_{DD}}{100}$ | $\frac{V_{DD}}{112.5}$ | $\frac{V_{DD}}{180}$ | 0 |

When the data is 00 and 11, as an inverted input is positioned on the opposite side by a differential structure, a constant current flows to $$\frac{V_{DD}}{100} + 0 = \frac{V_{DD}}{100}$$

in a driver.

In the disclosure, to maintain the change in amount of current flowing to a driver at a certain level by using the characteristics of this current, an encoding rule may be determined such that a sum of transmitted symbols is equal to or less than a designated level.

FIG. 5 is a diagram illustrating an example in which a data transmission device transmits data, according to an embodiment.

Referring to FIG. 5, an example of single-ended PAM-4 between the data transmission device 100 and a data receiving device may be confirmed. In a case of single-ended PAM-4, unlike the differential structure described above, a sum of symbols raised to a wire may be from −12 to 12, and as an absolute value of this value increases, the effect of noise increases. To adjust the sum of symbols to a level equal to or less than a designated level, an encoding rule of mapping data and symbols is required.

According to an embodiment, the data transmission device 100 may determine an encoding rule based on a designated level and generate a mapping table in which N-bit data and M data symbols are mapped according to the determined encoding rule. For example, FIG. 5 shows an embodiment in which the data transmission device 100 determined to follow the PAM 4 encoding rule implements 5 bits as four PAM 4 symbols according to a 5B4Q method and then transmits the four PAM 4 symbols to a data receiving device.

A mapping table in the data transmission device 100 may be generated based on a designated level. For example, an absolute sum of each of M data symbols included in the mapping table may have a value equal to or less than the designated level.

Figure 6:
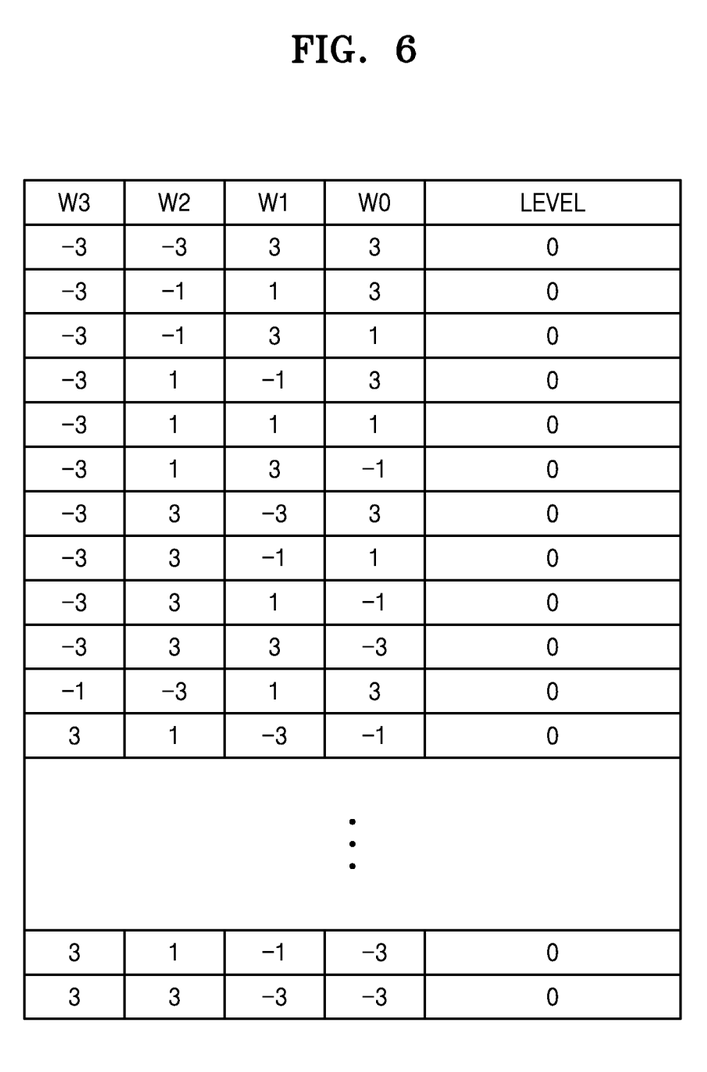
FIG. 6 is a diagram illustrating 4Q symbols having a designated level of "0", according to an embodiment.

FIG. 6 is a diagram illustrating 4Q symbols having a designated level of "0", according to an embodiment.

There are a total of 44 cases in which the absolute value of four data symbols is '0'. Among them, when 32 pieces of data are selected and used in a mapping table, all 5 bits may be implemented.

Although not shown in FIG. 6, the total number of cases in which an absolute value of four data symbols is equal to or less than '2' is 124, and a data transmission device may implement 6 bits when 64 cases are selected among the 124 cases. Similarly, the total number of cases in which an absolute sum of four data symbols is equal to or less than '4' is 186, the data transmission device may implement 7 bits when 128 cases are selected among the 186 cases.

Figure 7:
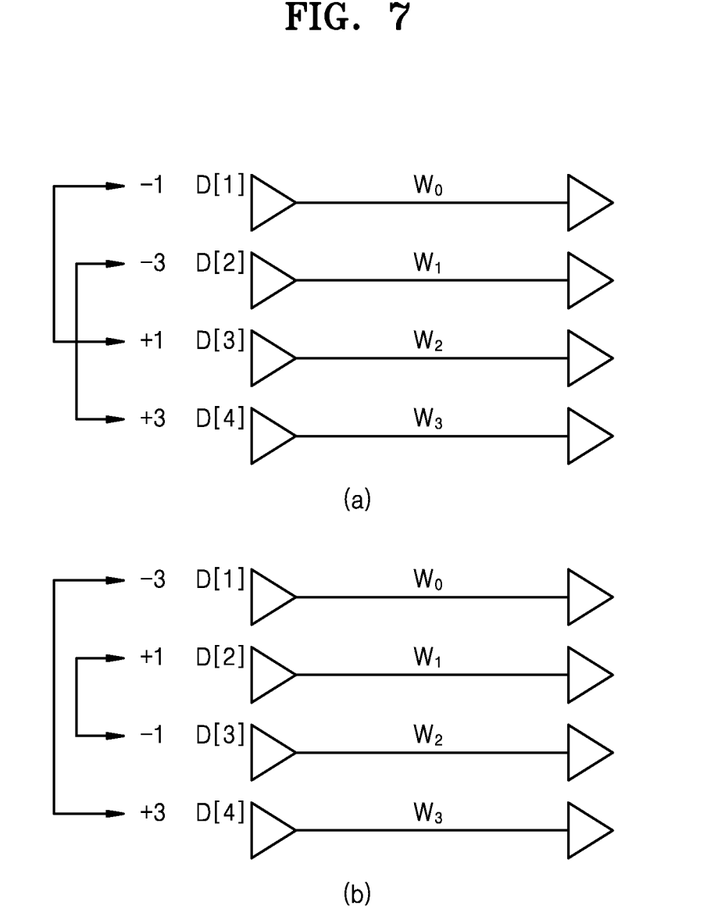
FIGS. 7 and 8 are diagrams illustrating examples in which a data transmission device transmits data when a designated level is "0"
Figure 8:
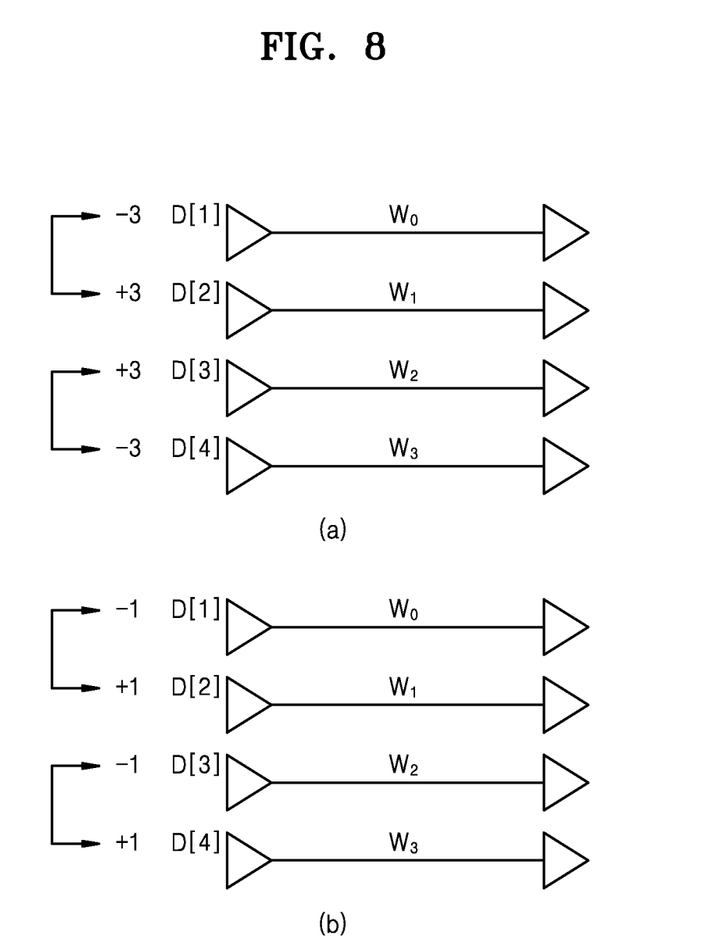

FIGS. 7 and 8 are diagrams illustrating examples in which a data transmission device transmits data when a designated level is "0".

Referring to (a) of FIG. 7, a case where each of data symbols is expressed as '−1', '−3', '+1', and '+3' is shown. In this case, an absolute sum of each of data symbols has a value of '0'.

Referring to (b) of FIG. 7, a case where each of data symbols is expressed as '−3', '+1', '−1', and '+3' is shown. In this case, an absolute sum of each of data symbols has a value of '0'.

Referring to (a) of FIG. 8, a case where each of data symbols is expressed as '−3', '+3', '+3', and '−3' is shown. In this case, an absolute sun of each of data symbols has a value of '0'.

Referring to (b) of FIG. 8, a case where each of data symbols is expressed as '−1', '+1', '−1', and '+1' is shown. In this case, an absolute sum of each of data symbols has a value of '0'.

Figure 9:
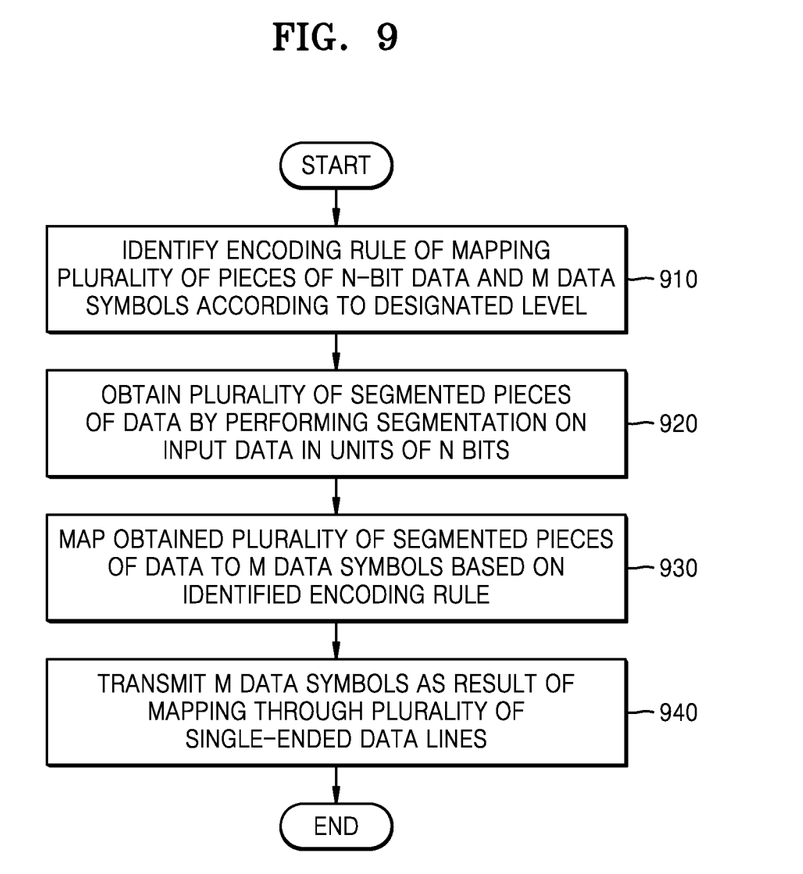
FIG. 9 is a flowchart for explaining a data transmission method according to an embodiment.

FIG. 9 is a flowchart for explaining a data transmission method according to an embodiment.

In operation 910, the data transmission device 100 may identify an encoding rule of mapping a plurality of pieces of N-bit data and M data symbols according to a designated level. As described above, a level may be designated by a user's choice or may be designated by the data transmission device 100 based on a communication environment. The communication environment may, for example, be identified based on feedback information about a reception error rate received from a data receiving device. The data transmission device 100 may decrease the designated level when the reception error rate is higher than a preset first criterion.

Also, the data transmission device 100 may increase the designated level when the reception error rate is lower than a preset second criterion.

An encoding rule according to an embodiment may include a PAM K data encoding rule, but this is only an example, and the encoding rule according to the disclosure is not limited to the PAM K data encoding rule. The data transmission device 100 may, for example, identify an encoding rule of 5B4Q according to a user's choice. According to the encoding rule of 5B4Q, each of 5 bits of data may be expressed as four symbols.

In operation 920, the data transmission device 100 may obtain a plurality of segmented pieces of data by performing segmentation on input data in units of N bits.

The data transmission device 100 may perform segmentation on the input data according to the encoding rule identified in the operation described above. For example, when an encoding rule of 5B4Q is selected, the data transmission device 100 may perform segmentation in units of 5 bits on the input data and obtain a plurality of segmented pieces of data each including 5 bits.

In operation 930, the data transmission device 100 may map the obtained plurality of segmented pieces of data to M data symbols based on the identified encoding rule.

In operation 910 described above, M data symbols that may be mapped to each 5-bit data have been determined. For example, when an encoding rule of 5B4Q is selected, the data transmission device 100 may map the plurality of segmented pieces of data each including 5 bits to each of M data symbols.

In operation 940, the data transmission device 100 may transmit M data symbols obtained as a mapping result through a plurality of single-ended data lines.

Figure 10:
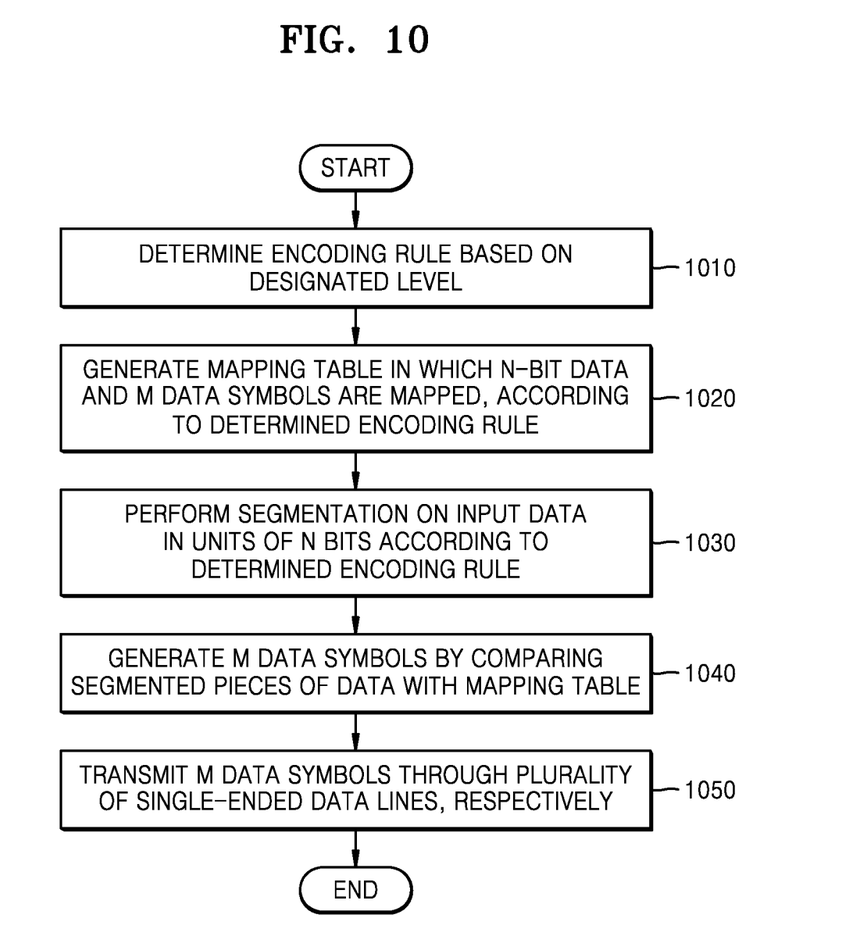
FIG. 10 is a flowchart for explaining a data transmission method using a mapping table generated according to an embodiment.

FIG. 10 is a flowchart for explaining a data transmission method using a mapping table generated according to an embodiment.

Referring to FIG. 10, in operation 1010, the data transmission device 100 may determine an encoding rule based on a designated level.

A level may be designated by a user's choice or may be designated by the data transmission device 100 based on a communication environment. For example, in a noise-tolerant environment, a data rate may be increased by increasing the designated level, and in a noise-vulnerable environment, data may be stably transmitted by lowering the designated level.

The communication environment may be determined based on feedback information received from a data receiving device. The feedback information may include, for example, a reception error rate of M data symbols. The data transmission device 100 may determine whether to adjust the designated level based on the feedback information. For example, the data transmission device 100 may decrease the designated level when the reception error rate is higher than a preset first criterion. As another example, the data transmission device 100 may increase the designated level when the reception error rate is lower than a preset second criterion.

The encoding rule may follow, for example, a PAM K data encoding rule. For example, the data transmission device 100 determined to follow a PAM 4 encoding rule may implement 5 bits as four PAM 4 symbols according to the 5B4Q method, or may implement 7 bits as four PAM 4 symbols according to the 7B4Q method.

In operation 1020, the data transmission device 100 may generate a mapping table in which N-bit data and M data symbols are mapped according to the determined encoding rule.

A mapping table may be generated based on a designated level. For example, a total sum of each of M data symbols included in the mapping table may have a value equal to or less than a designated level. For example, when the designated level is '0', at least one piece of data included in the mapping table may have an absolute sum of '0' of data symbols. As another example, when the designated level is '2', at least one piece of data included in the mapping table may have an absolute sum of '2' or less of data symbols.

In operation 1030, the data transmission device 100 may segment input data into units of N bits according to the determined encoding rule.

For example, when the encoding rule is determined as 5B4Q, the data transmission device 100 may segment the input data in units of 5 bits. However, this is only an example, and the encoding rule may also be determined as 6B4Q or 7B4Q.

In operation 1040, the data transmission device 100 may generate M data symbols by comparing the segmented pieces of data with a mapping table.

For example, when the encoding rule is determined as 5B4Q, the data transmission device 100 may compare the segmented pieces of data with the mapping table and express the segmented pieces of data as four data symbols.

In operation 1050, the data transmission device 100 may transmit M data symbols through a plurality of single-ended data lines, respectively.

For example, the data transmission device 100 may include a plurality of drivers connected to a plurality of data lines to simultaneously transmit M data symbols, and may be configured such that a connection structure of loads included in each driver varies according to the data symbols.

Configurations and effects of the method and device for data transmission with reduced supply noise according to an embodiment have been described in detail through the drawings.

The method and device for data transmission with reduced supply noise according to an embodiment may improve SI by reducing the effects due to supply noise.

Also, in the method and device for data transmission with reduced supply noise according to an embodiment, data rates are improved by using a single-ended channel as compared to a differential channel structure, power consumption is reduced, and pin-efficiency may be increased at the same time.

The device described above may be implemented a hardware component, a software component, and/or a combination of a hardware component and a software component. For example, the device and components described in the embodiments may be, for example, implemented by using one or more general-purpose computers or special-purpose computers, such as a processor, an arithmetic logic unit (ALU), a digital signal processor, a microcomputer, a field programmable array (FPA), a programmable logic unit (PLU), a microprocessor, or any other device capable of executing and responding to instructions. A processing device may perform an operating system (OS) and one or more software applications being executed in the OS. Also, the processing device may also access, store, manipulate, process, and generate data in response to execution of software. For convenience of understanding, a case where one processing device is used is described, but those skilled in the art may know that a processing device may include a plurality of processing elements and/or a plurality of types of processing elements. For example, the processing device may include a plurality of processors or may include one processor and one controller. Also, the processing device may have other processing configurations, such as parallel processors.

Software may include a computer program, code, an instruction, of a combination of one or more of the computer programs, codes, and instructions, and may configure the processing device to operate as desired or may independently or collectively command the processing devices. Software and/or data may be embodied in any tangible machine, component, physical device, virtual equipment, computer storage medium or device to be interpreted by the processing device or to provide instructions or data to the processing device. Software may be distributed on networked computer systems to be stored or executed in a distributed manner. Software and data may be stored in one or more computer-readable recording media.

The method according to an embodiment may be implemented in the form of program instructions that may be executed through various computer means and may be recorded in a computer-readable medium. The computer-readable medium may include program instructions, data files, data structures, or the like alone or in combination. The program instructions recorded in the medium may be specially designed and configured for the embodiment or may be known and usable to those skilled in computer software. Examples of the computer-readable recording medium include magnetic media such as hard disks, floppy disks, and magnetic tapes, optical media such as compact disc-read only memory (CD-ROM) and digital versatile disk (DVD), magneto-optical media such as floptical disks, and hardware devices specially configured to store and execute program instructions, such as ROM, random-access memory (RAM), flash memory, or the like. Examples of program instructions include machine language codes such as those produced by a compiler and high-level language codes that may be executed by a computer using an interpreter or the like.

The method and device for data transmission with reduced supply noise according to an embodiment may improve SI by reducing the effects due to supply noise.

Also, in the method and device for data transmission with reduced supply noise according to an embodiment, data rates are improved by using a single-ended channel as compared to a differential channel structure, power consumption is reduced, and pin-efficiency may be increased at the same time.

Effects of the disclosure are not limited to the technical objectives mentioned above, and other effects not mentioned may be clearly understood by those skilled in the art from the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method for data transmission based on a pulse amplitude modulation (PAM)-M data encoding rule, the method comprising:

determining a level L among a total of T levels based on a reception error rate of M data symbols, wherein T is determined based on M that is a number of the data symbols;

identifying a first encoding rule of mapping a plurality of pieces of N-bit data and the M data symbols, according to the determined level L, wherein an absolute value of a sum of the M data symbols is equal to or less than the determined level L;

obtaining a plurality of segmented pieces of data by performing segmentation on input data in units of N bits;

mapping the obtained plurality of segmented pieces of data to the M data symbols based on the identified first encoding rule; and transmitting the M data symbols obtained as a result of mapping through a plurality of single-ended data lines.

2. The method of claim 1, wherein the identifying of the first encoding rule comprises identifying a mapping table representing the M data symbols mapped with the plurality of pieces of N-bit data.

3. The method of claim 2, wherein at least one piece of data comprised in the mapping table has an absolute value of a sum of data symbols of 0.

4. The method of claim 1, wherein, when the level L among the total of T levels is determined based on the reception error rate of the M data symbols, the method further comprises:

obtaining feedback information regarding the reception error rate of the M data symbols.

5. The method of claim 1, wherein, when the level L among the total of T levels is determined based on the reception error rate of the M data symbols, the determining the level L comprises:

determining the level L as a level lower than a predetermined level, when the reception error rate is higher than a preset first criterion; and determining the level L as a level higher than the predetermined level, when the reception error rate is lower than a preset second criterion.

6. The method of claim 1, wherein the first encoding rule is determined based on any one method of a 5 bit 4 quaternary (5B4Q) method, a 6 bit 4 quaternary (6B4Q) method, or a 7 bit 4 quaternary (7B4Q) method.

7. A data transmission device configured based on a pulse amplitude modulation (PAM)-M data encoding rule, the data transmission device comprising:

a communication unit;
   a memory configured to store at least one instruction; and
   a processor connected to the communication unit, wherein the processor, by executing the at least one instruction, is configured to:

determine a level L among a total of T levels based on a reception error rate of M data symbols, wherein T is determined based on M that is a number of the data symbols, identify a first encoding rule of mapping a plurality of pieces of N-bit data and the M data symbols, according to the determined level L, wherein an absolute value of a sum of the M data symbols is equal to or less than the determined level L, obtain a plurality of segmented pieces of data by performing segmentation on input data in units of N bits, map the obtained plurality of segmented pieces of data to the M data symbols based on the identified first encoding rule, and transmit the M data symbols obtained as a result of mapping through a plurality of single-ended data lines.

8. The data transmission device of claim 7, wherein the processor, by executing the at least one instruction, is further configured to identify a mapping table representing the M data symbols mapped with the plurality of pieces of N-bit data.

9. The data transmission device of claim 8, wherein at least one piece of data comprised in the mapping table has an absolute value of a sum of data symbols of 0.

10. The data transmission device of claim 7, wherein, when the level L among the total of T levels is determined based on the reception error rate of the M data symbols, the processor, by executing the at least one instruction, is further configured to obtain feedback information regarding the reception error rate of the M data symbols.

11. The data transmission device of claim 7, wherein, when the level L among the total of T levels is determined based on the reception error rate of the M data symbols, the processor, by executing the at least one instruction, is further configured to:

determine the level L as a level lower than a predetermined level, when the reception error rate is higher than a preset first criterion, and determine the level L as a level higher than the predetermined level, when the reception error rate is lower than a preset second criterion.

12. The data transmission device of claim 7, wherein the first encoding rule is determined based on any one method of a 5 bit 4 quaternary (5B4Q) method, a 6 bit 4 quaternary (6B4Q) method, or a 7 bit 4 quaternary (7B4Q) method.

13. The data transmission device of claim 7, wherein the determined level L is 2 or less.

* * * * *